No. 812,857. PATENTED FEB. 20, 1906.
A. LOTZ.
AUTOMATIC SQUARE CAN HEADING AND CRIMPING MACHINE.
APPLICATION FILED MAR. 19, 1904.
8 SHEETS—SHEET 4.
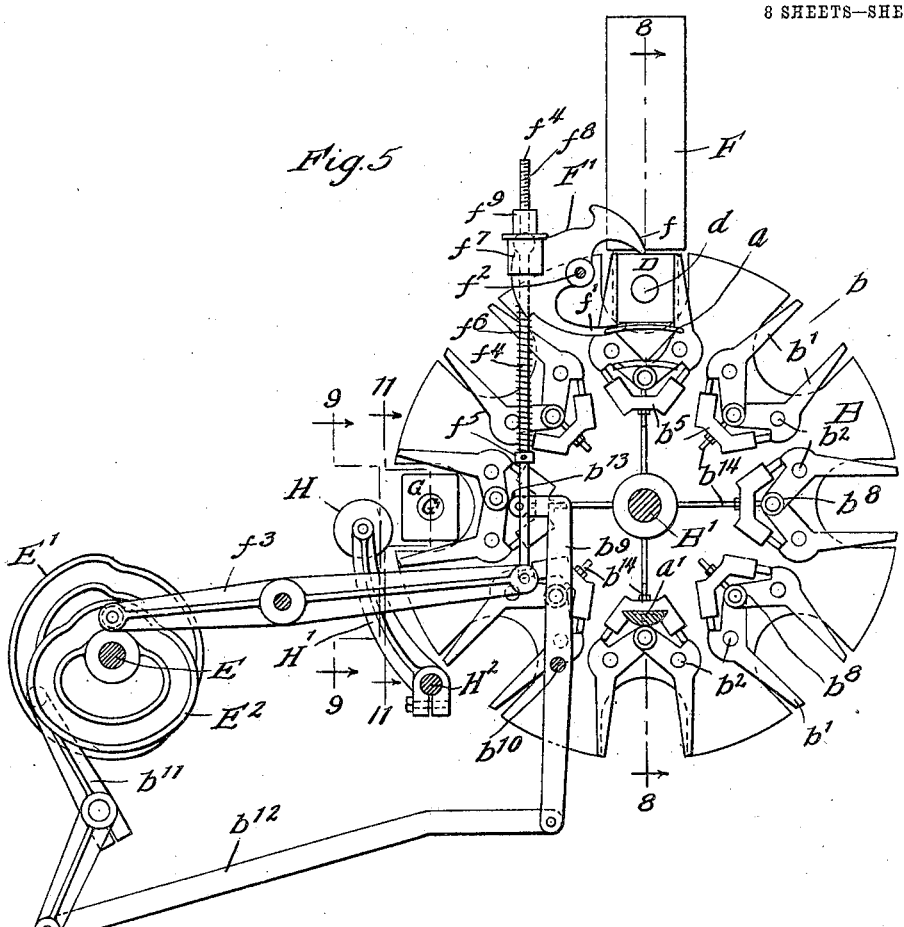
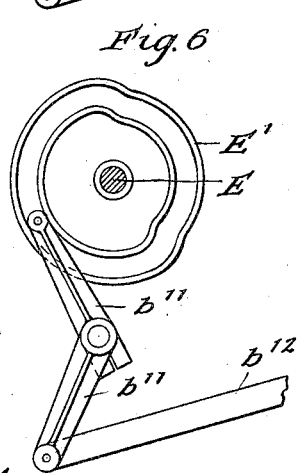
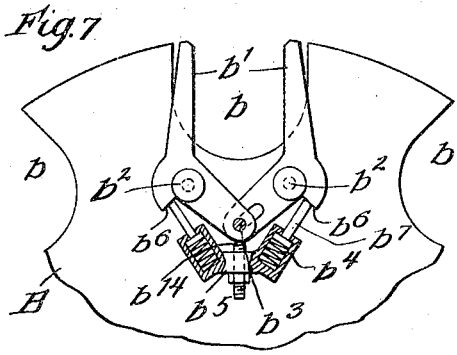
Witnesses:
Wm. Geiger
H. W. Munday
Inventor
Augustus Lotz
By Munday, Evarts & Adcock.
Attorneys No. 812,857. PATENTED FEB. 20, 1906.
A. LOTZ.
AUTOMATIC SQUARE CAN HEADING AND CRIMPING MACHINE.
APPLICATION FILED MAR. 19, 1904.
8 SHEETS—SHEET 5.
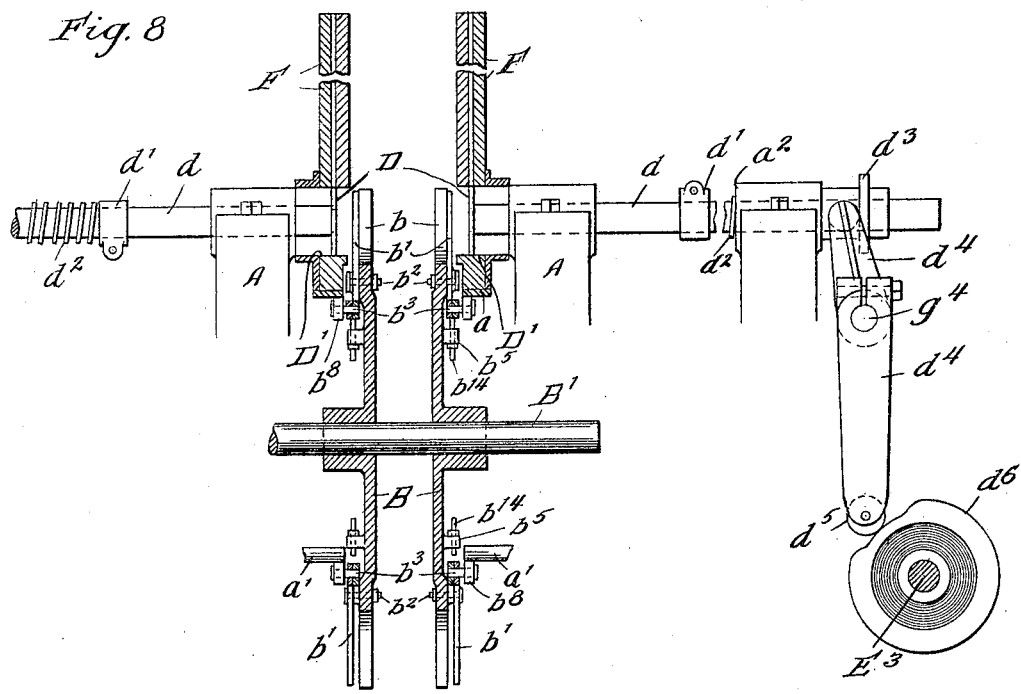
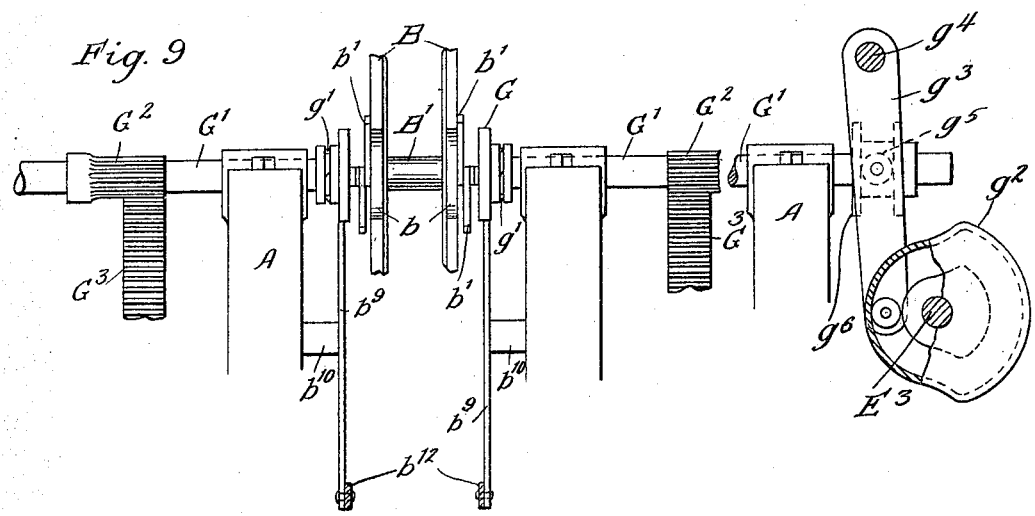
Witnesses:
Wm. Geiger
A. W. Munday
Inventor:
Augustus Lotz
By Munday, Evarts & Adcock
Attorneys No. 812,857. PATENTED FEB. 20, 1906.
A. LOTZ.
AUTOMATIC SQUARE CAN HEADING AND CRIMPING MACHINE.
APPLICATION FILED MAR. 19, 1904.
8 SHEETS—SHEET 6.
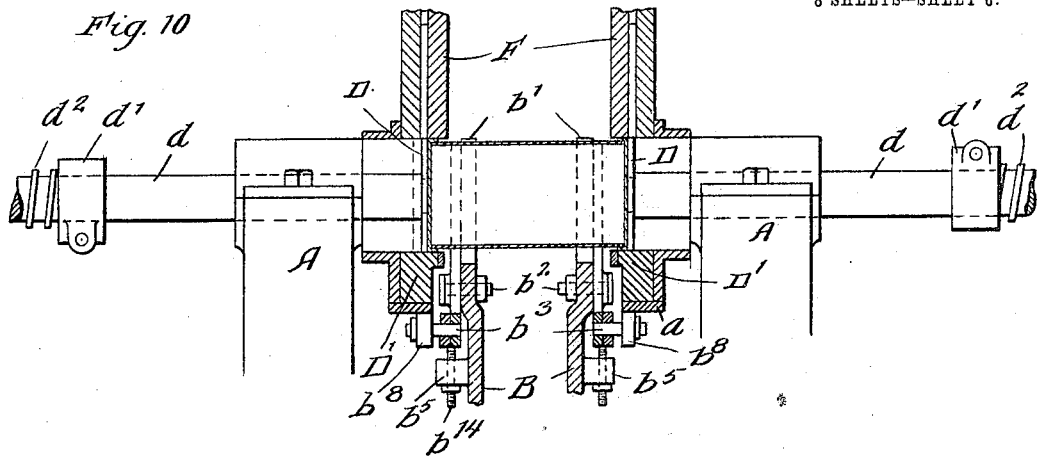
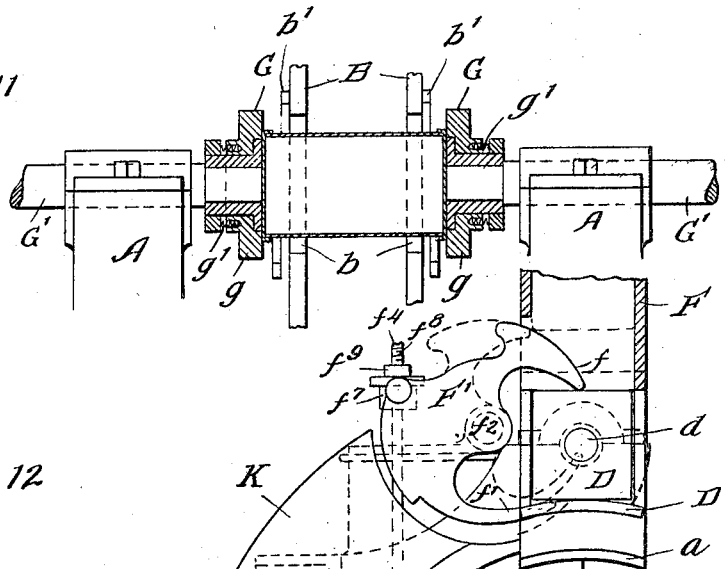
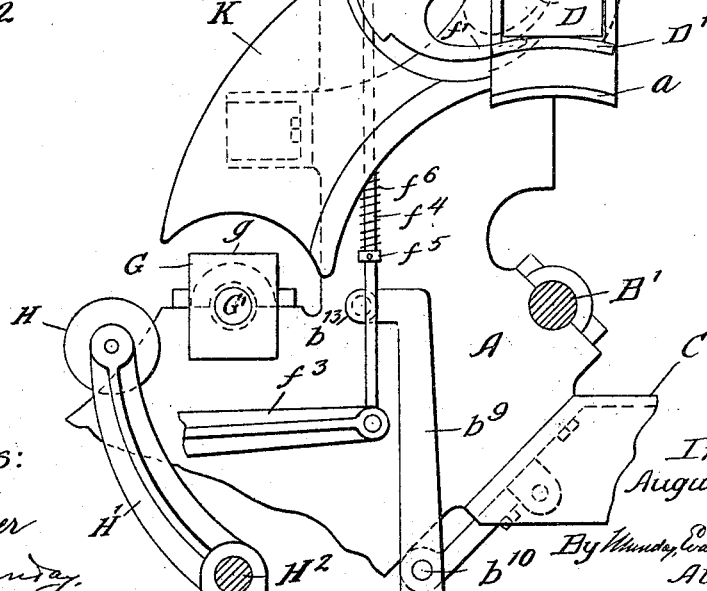
Witnesses:
Wm. Geiger
A. W. Munday
Inventor:
Augustus Lotz
By Munday, Evarts & Adcock
Attorneys

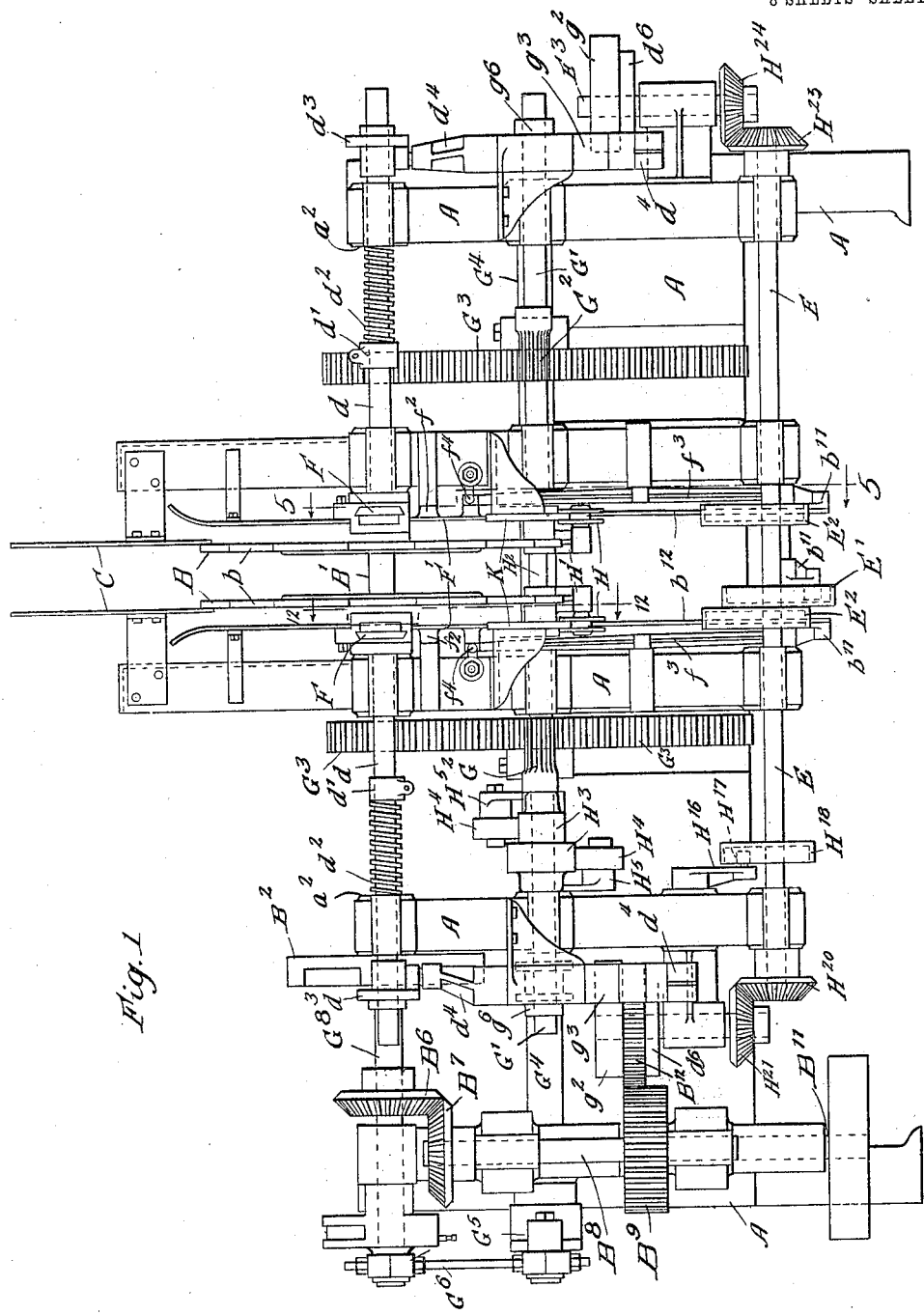

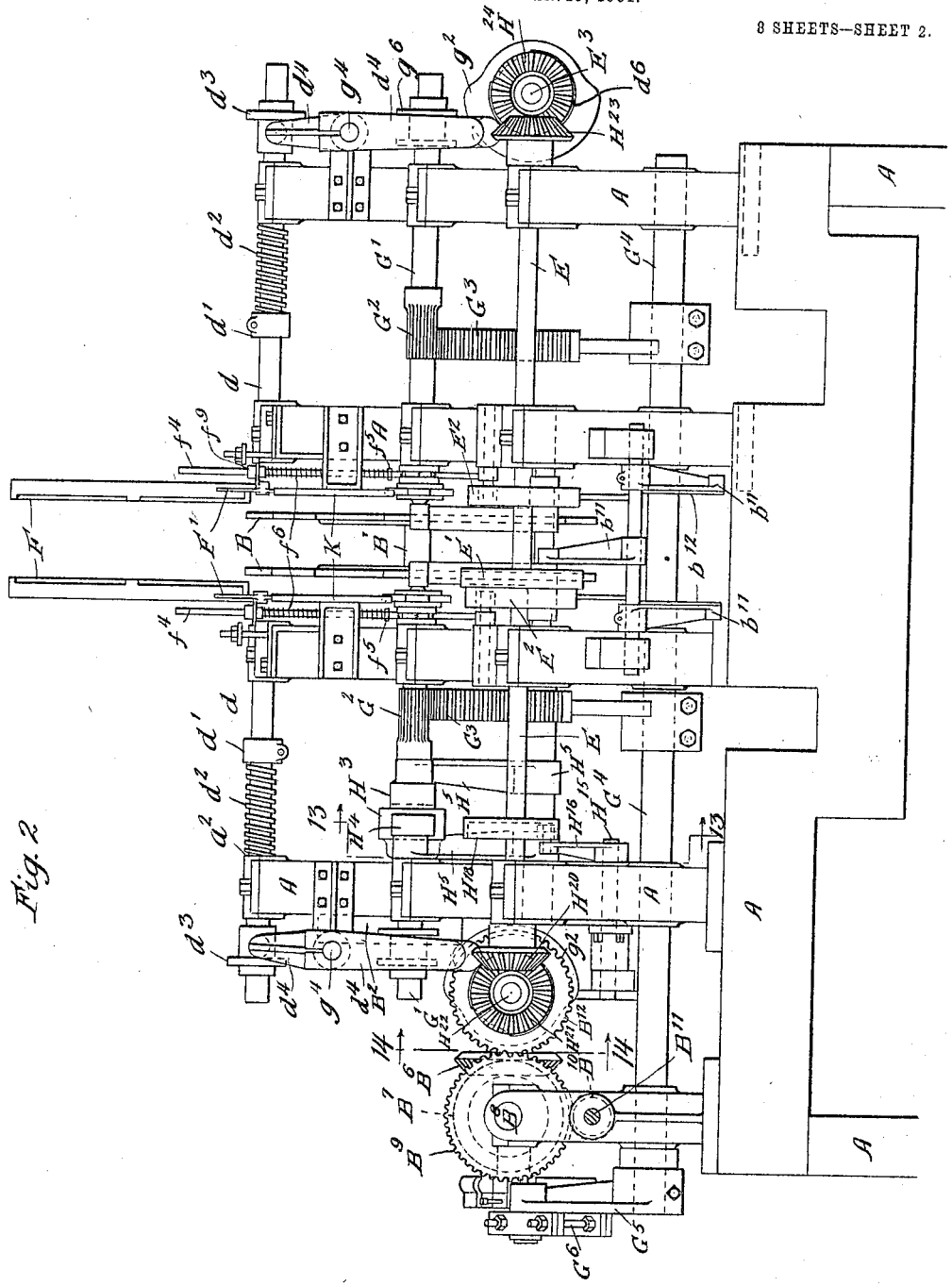

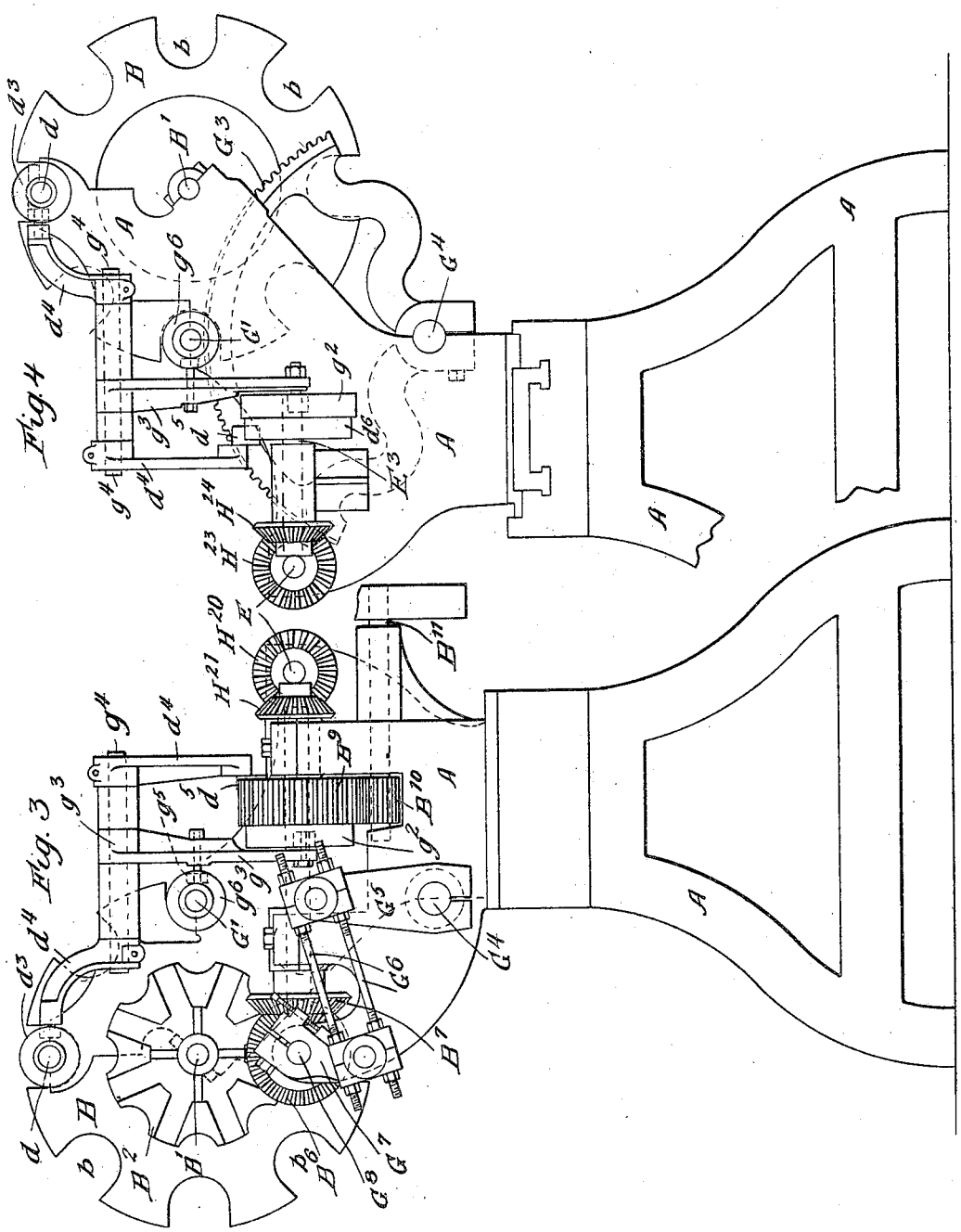

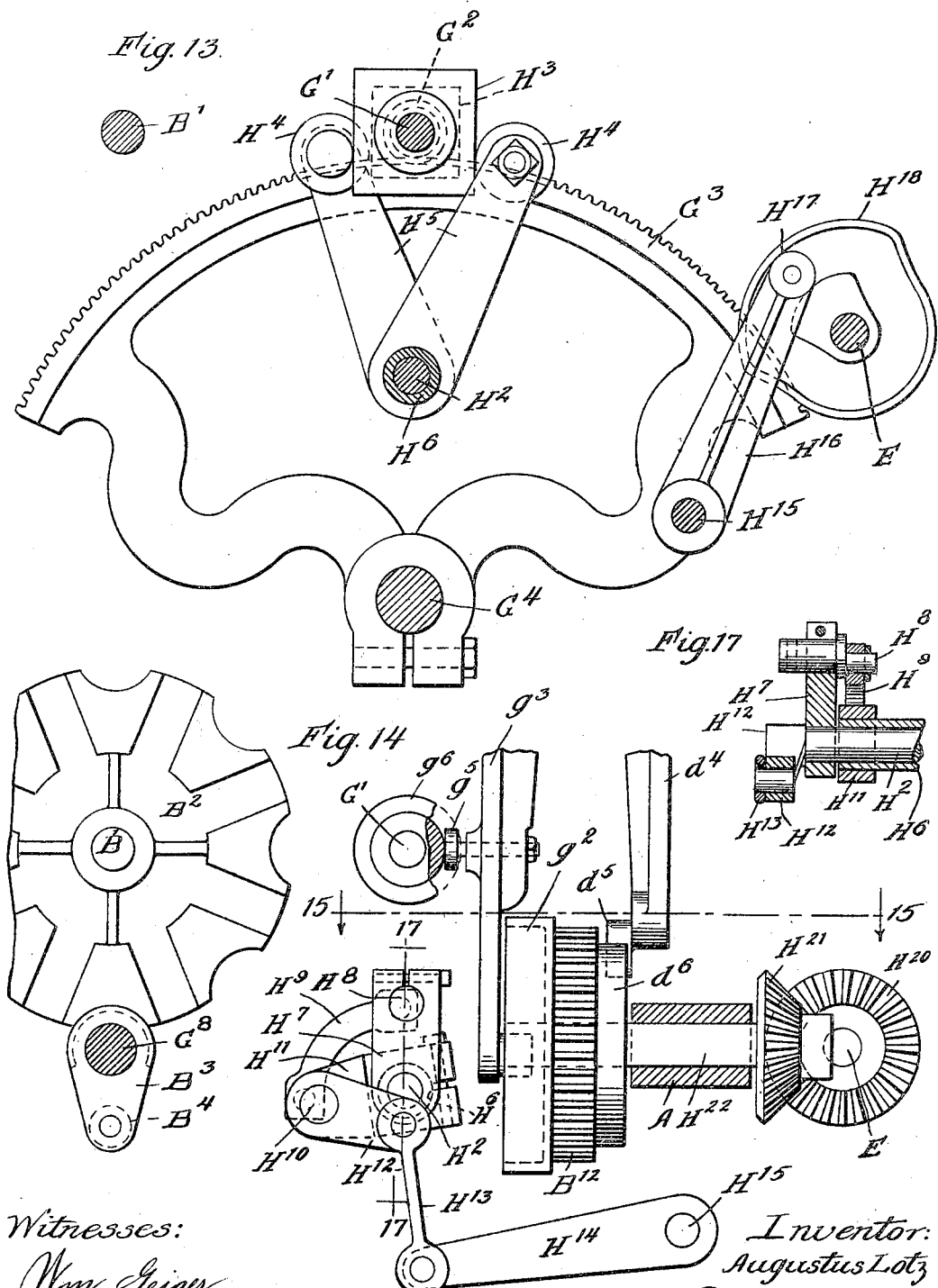

No. 812,857. PATENTED FEB. 20, 1906.
A. LOTZ.
AUTOMATIC SQUARE CAN HEADING AND CRIMPING MACHINE.
APPLICATION FILED MAR. 19, 1904.

8 SHEETS—SHEET 8.

Witnesses:
Wm. Geiger
A. W. Munday

Inventor:
Augustus Lotz
By Munday, Evarts & Adcock.
Attorneys

UNITED STATES PATENT OFFICE.

AUGUSTUS LOTZ, OF SAN FRANCISCO, CALIFORNIA, ASSIGNOR TO AMERICAN CAN COMPANY, OF JERSEY CITY, NEW JERSEY, A CORPORATION OF NEW JERSEY.

AUTOMATIC SQUARE-CAN HEADING AND CRIMPING MACHINE.

No. 812,857.  Specification of Letters Patent.  Patented Feb. 20, 1906.

Application filed March 19, 1904. Serial No. 198,891.

*To all whom it may concern:*

Be it known that I, AUGUSTUS LOTZ, a citizen of the United States, residing in San Francisco, in the county of San Francisco and State of California, have invented a new and useful Improvement in Square-Can Heading and Crimping Machines, of which the following is a specification.

My invention relates to can heading and crimping machines, and more particularly to machines for applying heads to square or rectangular can-bodies and crimping the same thereon.

The object of my invention is to provide an automatic square-can heading and crimping machine of a simple, efficient, and durable construction by means of which the heads may be automatically applied to square or rectangular can-bodies and the heads crimped thereon rapidly and cheaply.

My invention consists in the means I employ to accomplish this result—that is to say, it consists in the novel construction of parts and devices and in the novel combinations of parts and devices herein shown and described.

Figure 15:
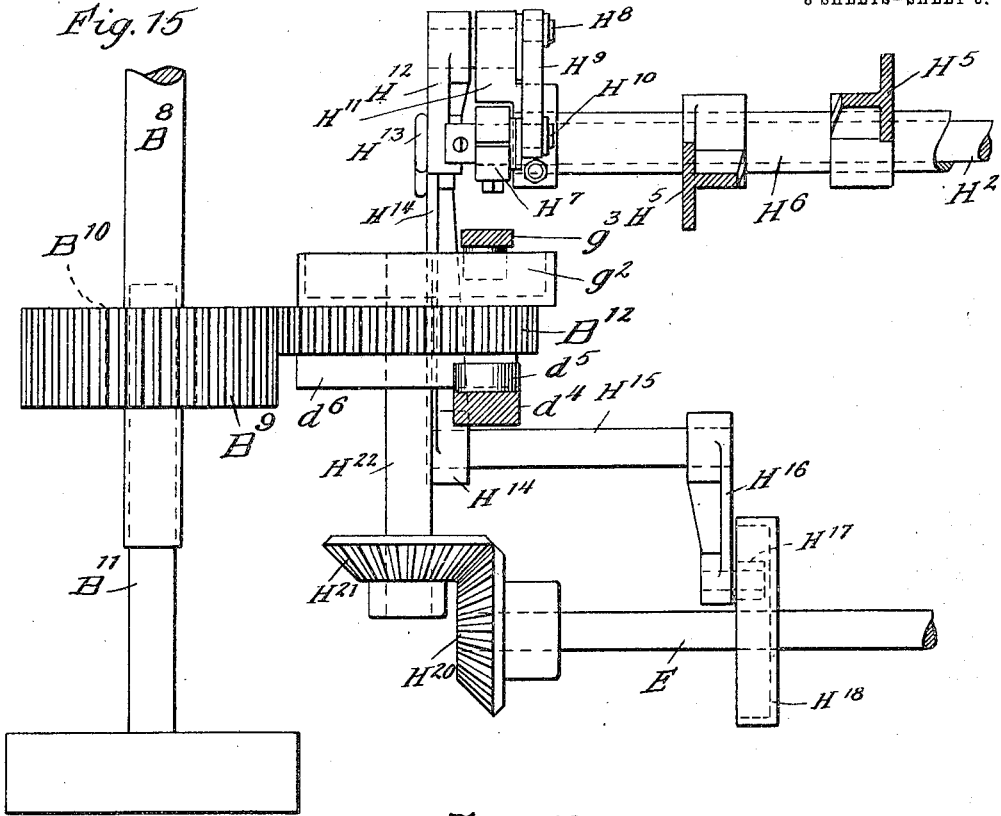
Figure 16:
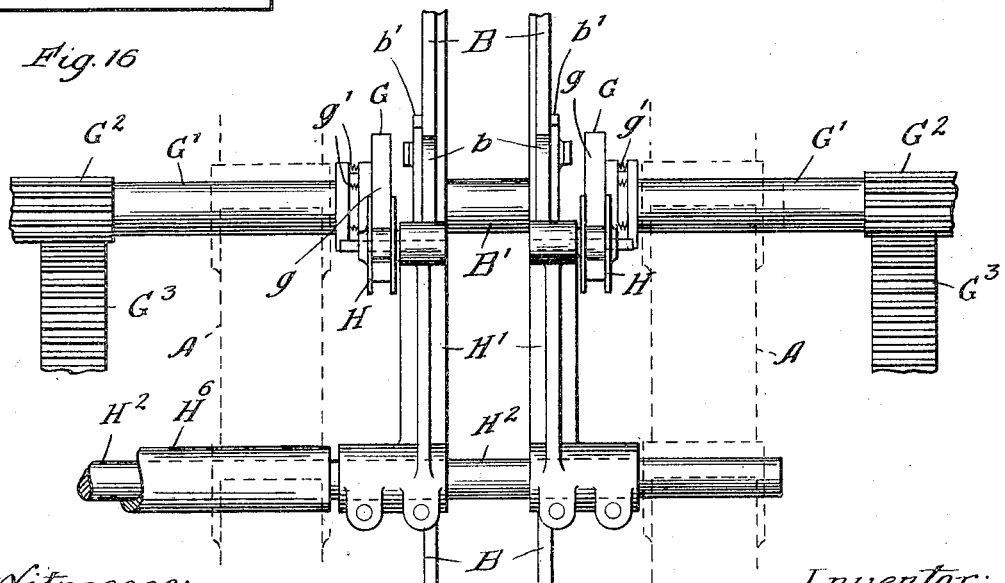

In the accompanying drawings, forming a part of this specification, Figure 1 is a plan view of a square-can heading and crimping machine embodying my invention. Fig. 2 is a side elevation. Figs. 3 and 4 are end elevations looking from opposite sides. Fig. 5 is a vertical section on line 5 5 of Fig. 1. Fig. 6 is a detail elevation showing the cam for operating the can-body clamps. Fig. 7 is a detail view, partly in section, showing the can-body clamps. Fig. 8 is a vertical section on line 8 8 of Fig. 5, showing the can-head chutes, heading-plunger, and carrier. Fig. 9 is a detail elevation looking from line 9 9 of Fig. 5, showing the crimping-chucks and other parts. Fig. 10 is a detail section, enlarged, on line 8 8 of Fig. 5, showing the heading-plungers and other adjacent parts. Fig. 11 is a detail section on line 11 11 of Fig. 5, showing the crimping-chucks closed upon the can. Fig. 12 is a detail section on line 12 12 of Fig. 1, showing the can-head feed-escapement mechanism and other parts, the can-body carrier being shown in dotted lines. Fig. 13 is a detail section on line 13 13 of Fig. 2, showing the pattern-can mechanism for guiding the crimping-rollers. Fig. 14 is a detail section on line 14 14 of Fig. 2, showing the mechanism for intermittently rotating the can-body carrier and other parts hereinafter described. Fig. 15 is a detail section on line 15 15 of Fig. 14, showing the crimping-roller-operating mechanism and other parts. Fig. 16 is a detail elevation showing the crimping-rolls. Fig. 17 is a detail section on line 17 17 of Fig. 14.

The automatic machine embodying my invention, as shown in said drawings, comprises in operative combination an intermittently-revolving can-body feed-wheel or carrier having pockets to receive the cans, opening and closing can-body holding-clamps mounted on the can-body carrier and automatically opened and closed to clamp the can-bodies and center the same with the can-heads, a can-body chute, a pair of can-head chutes, a pair of oscillating can-head feeders operating to feed the can-heads one by one, reciprocating can-heading plungers for pushing the can-heads on the can-bodies, side guides for the headed cans, a pair of rotating and reciprocating crimper-chucks for chucking and rotating the headed can during the crimping operation, crimping-rolls mounted on oscillating arms or levers, oscillating segments for rotating the crimping-chucks, cams and levers for reciprocating the heading-plungers and crimping-chucks, mechanism for intermittently revolving the can-body carrier or feed wheels, mechanism for opening and closing the can-body clamps, and mechanism for operating the oscillating can-head feed devices or escapements, as will be more readily understood by reference to the drawings and the detail description of the same.

In said drawings, A represents the frame of the machine, the same being of any suitable form or construction for giving support to the various operative parts.

B is the intermittently-rotating can-body carrier or feed-wheel, the same preferably comprising two disks secured to an intermittently-rotating shaft B'. The can-body carrier or feed wheel B is provided with a series of can-body-receiving pockets $b$ therein, each furnished with opening and closing can-body clamps $b'$ $b'$, pivoted or hinged at $b^2$ $b^2$ to the can-body feed-wheel B, and having a pivotpin $b^3$, connecting them together at their inner ends or arms. The can-body clamps $b'$ are preferably closed and held yieldingly closed by springs $b^4$, having seats $b^5$ on the can-body carrier-wheel B, and acting against shoulders $b^6$ on the clamp $b'$ through the connecting-pins $b^7$. The can-body clamps $b'$ are automatically and positively closed to firmly clamp the can-body and center it with the heading-plungers D by a stationary cam or guide $a$ on the frame of the machine, which is engaged by the antifriction-roller $b^8$ on the hinge-pin $b^3$, which connects the pivot-clamps together. The hinged can-body clamps are automatically opened after the can-body is chucked or grasped between the rotating and reciprocating can-head crimping-chucks G G by means of a vibrating lever $b^9$, pivoted at $b^{10}$ to the frame of the machine and operated by a cam $E'$ on the cam-shaft E through the connecting-levers $b^{11}$ $b^{11}$ and link $b^{12}$. The can-body-clamp-operating lever $b^9$ is preferably furnished with antifriction inner arms of clamps $b'$ to engage the roller $b^8$. The spring-seats $b^5$ $b^5$ on the can-body carrier or feed wheel B are each furnished with an adjustable stop $b^{14}$ to limit the closing movement of the hinged clamps $b'$ $b'$. The can-body clamps $b'$ $b'$ are positively opened at the can-body discharge position of the carrier B to permit the headed and crimped cans to automatically discharge from the carrier by means of a stationary cam or projection $a'$ on the frame of the machine, which engages the antifriction-roller $b^8$ on the pin $b^3$.

C is the can-body feed-chute, along which the can-bodies are fed or pushed into the pockets of the feed-wheels and between the spring-actuated opening and closing clamps $b'$ $b'$ thereon.

The can-heading plungers D D reciprocate in suitable can-head guides $D'$ at the base of the can-head chutes F to push the can-heads into registry therewith onto the can-body held in registry therewith by the can-body clamps $b'$ $b'$ on the can-body carrier or feed-wheel B. The can-heading plungers D are reciprocated as required to push the can-heads on the can-bodies by their stems $d$, furnished with collars $d'$, fixed thereon, and springs $d^2$, operating against said collars at one end and against the stationary frame at $a^2$, thrust-collars $d^3$, fixed to said stems $d$, and operated by vibrating levers $d^4$, having each an antifriction-roller $d^5$ engaging a cam $d^6$ on the shaft $E^3$. The plungers are yieldingly moved forward to push the can-heads on the can-body by the springs $d^2$ when the cams $d^6$ and operating-levers $d^4$ permit the springs so to do at the proper time. The can-heads are intermittently fed down through the can-head chutes F into the can-head guide $D'$ in front of the heading-plunger D when the heading-plunger is retracted by the oscillating can-head feed-escapement $F'$, having two curved arms $f f'$, which alternately project in the path of the can-head as the feed-escapement oscillates on its shaft or pivot $f^2$. The can-head feed-escapements $F'$ for the can-head chutes F are intermittently oscillated as required, each by a cam $E^2$ on the cam-shaft E, through the connecting-lever $f^3$, connecting-rod $f^4$, having fixed collar $f^5$, spring $f^6$, and adjustable collar $f^7$, connected to the oscillating escapement $F'$. The connecting-rod $f^4$ is adjustably secured to the collar $f^7$ by screw-threads $f^8$ and nut $f^9$.

The rotating and reciprocating crimping-chucks G G each have an injector or movable ring $g$, furnished with a spring-support $g'$ to prevent the can-heads from sticking to the crimping-chuck and to cause the free discharge of the headed and crimped cans after the crimping operation is completed. The shafts $G'$ of the crimping chucks or disks G are reciprocated as required by a cam $g^2$ on the shaft $E^3$, which actuates an operating-lever $g^3$, pivoted to the frame at $g^4$ and connected by a roller $g^5$ with a collar $g^6$, the shaft $G'$ being rotatably connected with the collar $g^6$, so that the shaft can rotate in respect to the collar, while the collar is fixed longitudinally in respect to the shaft. The crimping-chuck shafts $G'$ $G'$ are each rotated as required to coöperate with the crimping-rollers by means of gears $G^2$ thereon, which mesh with oscillating segment-racks $G^3$ on rock-shafts $G^4$, having a crank-arm $G^5$ connected by an adjustable link $G^6$ with a crank-arm $G^7$ on the shaft $G^8$.

The crimping-rollers H are mounted each on an oscillating arm $H'$, secured to a rock-shaft $H^2$. The crimping-roller H is caused to follow the contour of the square or rectangular can as it is rotated by the crimping-chucks by means of a pattern-cam $H^3$ on the chuck-shaft $G'$, which engages rollers $H^4$ on arms $H^5$, secured to a sleeve $H^6$, surrounding the crimping-roller rock-shaft $H^2$. The sleeve $H^6$ is connected to the rock-shaft $H^2$ through the arm $H^7$, which carries an eccentric stud $H^{10}$, connected by an arm $H^9$ with an eccentric stud $H^{10}$, mounted in an arm $H^{11}$, secured to the sleeve $H^6$. The eccentric stud $H^8$ has an arm $H^{12}$, connected by a link $H^{13}$ to an arm $H^{14}$ on the shaft $H^{15}$, having an arm $H^{16}$, carrying a roller $H^{17}$, engaging the crimping-roller-operating cam $H^{18}$ on the shaft E. The shaft E has bevel-gears $H^{20}$ meshing with bevel-gears $H^{21}$ on the short shafts $H^{22}$.

The can-body carrier or feed wheel B or its shaft $B'$ is intermittently rotated and accurately stopped in position to cause the can-body holding-clamps $b'$ $b'$ thereon to register with the can-heading plungers, the crimping-disks, and the feed-chutes as required by means of a Geneva stop mechanism comprising a notched disk or wheel $B^2$ and crank-arm $B^3$, having antifriction-roller $B^4$ secured to the shaft $G^8$. The shaft $G^8$ is continuously rotated by means of a bevel-gear $B^6$ thereon meshing with a bevel-gear $B^7$ on a shaft $B^8$, having a gear $B^9$ meshing with a gear $B^{10}$ on the power-shaft $B^{11}$. The gear $B^9$ also meshes with a gear $B^{12}$ on the short shaft $H^{22}$, thus communicating motion to the cam-shaft E and shaft $E^3$ through gears $H^{23}$ and $H^{24}$.

Side guides K K on each side of the carrier-wheel B hold the cans endwise in position in the clamps $b'$ $b'$ of the carrier-wheel as the headed can is carried forward from the heading position to the crimping position.

I claim—

1. In a square-can heading and crimping machine, the combination with an intermittently-rotating can-body carrier or feed wheel furnished with pockets to receive the can-bodies, and with opening and closing spring-actuated can-body clamps, of a can-body feed device or chute, can-head chutes, oscillating can-head feed-escapements for the can-head chutes, can-head guides at the base of the can-head chutes, reciprocating can-heading plungers for pushing the can-heads onto the can-bodies, reciprocating and rotating crimper-chucks, crimping-rolls mounted on oscillating arms, pattern-cams on the crimping-chuck shafts, oscillating arms having rollers engaging the pattern-cams, mechanism connecting the crimping-roller arms with the pattern-cam-roller arms, and an operating-cam for the crimping-rollers, substantially as specified.

2. In a square-can heading and crimping machine, the combination with an intermittently-rotating can-body feed-wheel having pockets to receive the can-bodies and opening and closing can-body clamps, can-head feed-chutes, can-head feed devices, reciprocating can-heading plungers, reciprocating and rotating crimping-chucks, crimping-rollers, and mechanism for operating the crimping-rollers, means for automatically and positively opening the can-body clamps substantially as specified.

3. In a square-can heading and crimping machine, the combination with an intermittently-rotating can-body feed-wheel having pockets to receive the can-bodies, opening and closing can-body clamps, can-head chutes, can-head feeders, reciprocating heading-plungers, reciprocating and rotating crimping-chucks, pattern-cams, crimping-rollers, connecting mechanism between the crimping-rollers and pattern-cams, and a pressure-cam for operating the crimping-rollers, substantially as specified.

4. The combination with can-head chutes and heading-plungers, of an intermittently-revolving can-body feed-wheel, having pockets to receive the can-bodies, and opening and closing can-body clamps, and springs for yieldingly closing the clamps, means for automatically and positively opening the can-body clamps substantially as specified.

5. The combination with can-head chutes and heading-plungers, of an intermittently-revolving can-body feed-wheel, having pockets to receive the can-bodies, and opening and closing can-body clamps, and springs for yieldingly closing the clamps, and a stationary cam for positively holding the clamps closed in the heading position, substantially as specified.

6. The combination with can-head chutes and heading-plungers, of an intermittently-revolving can-body feed-wheel having pockets to receive the can-bodies, and opening and closing can-body clamps, a spring for yieldingly closing the clamps, a stationary cam for positively holding the clamps closed in the heading position, and a movable device for positively opening the clamps, substantially as specified.

7. The combination with can-head chutes and heading-plungers, of an intermittently-revolving can-body feed-wheel having pockets to receive the can-bodies, and opening and closing can-body clamps, a spring for yieldingly closing the clamps, a stationary cam for positively holding the clamps closed in the heading position, reciprocating and rotating crimping-chucks, crimping-rollers and a movable lever for positively opening the can-body clamps at the crimping position, substantially as specified.

8. The combination with can-head chutes and heading-plungers, of an intermittently-revolving can-body feed-wheel having pockets to receive the can-bodies, and opening and closing can-body clamps, a spring for yieldingly closing the clamps, a stationary cam for positively holding the clamps closed in the heading position, reciprocating and rotating crimping-chucks, crimping-rollers and a movable lever for positively opening the can-body clamps at the crimping position, and a stationary cam for positively opening the can-body clamps at the discharge position, substantially as specified.

9. In a square-can heading and crimping machine, the combination with can-head chutes, of reciprocating heading-plungers, an intermittently-revolving can-body feed-wheel having pockets therein to receive the can-bodies, and automatically opening and closing can-body clamps, reciprocating and rotating crimping-shafts and crimping-rollers, and means for positively opening the can-body clamps at the crimping position substantially as specified.

10. In a square-can heading and crimping machine, the combination with can-head chutes, of reciprocating heading-plungers, an intermittently-revolving can-body feed-wheel having pockets therein to receive the can-bodies, and opening and closing can-body clamps, reciprocating and rotating crimping-shafts, pattern-cams and crimping-rollers, connecting mechanism between the pattern-cams and the crimping-rollers, and means for operating the crimping-rollers, substantially as specified.

11. In a square-can heading and crimping machine, a can-body feed-wheel having pockets therein to receive the can-bodies, opening and closing can-body clamps, and springs for closing said clamps, and a movable positively-operated device for opening the clamps at the crimping position substantially as specified.

12. In a square-can heading and crimping machine, a can-body feed-wheel having pockets therein to receive the can-bodies and opening and closing can-body clamps, springs for closing said clamps, in combination with a positively-operated device for automatically opening said clamps at the crimping position, substantially as specified.

13. In a square-can heading and crimping machine, a can-body feed-wheel having pockets therein to receive the can-bodies and automatically opening and closing can-body clamps, springs for closing said clamps, in combination with a stationary cam for positively closing and holding closed the clamps at the heading position, and means for automatically opening the clamps at the crimping position, substantially as specified.

14. In a square-can heading and crimping machine, a can-body feed-wheel having pockets therein to receive the can-bodies, and opening and closing can-body clamps, springs for closing said clamps, in combination with a stationary cam for positively closing and holding closed the clamps, and a movable positively-operated device for opening the clamps, substantially as specified.

AUGUSTUS LOTZ.

Witnesses:
   THOS. R. KENT,
   CHARLES E. BULL.